United States Patent

Kovac

(10) Patent No.: US 8,230,571 B2
(45) Date of Patent: Jul. 31, 2012

(54) SELF-ATTACHING FASTENER AND PANEL ASSEMBLY, METHOD OF INSTALLATION AND DIE MEMBER

(75) Inventor: Zdravko Kovac, Chesterfield, MI (US)

(73) Assignee: Whitesell International Corporation, Taylor, MI (US)

( * ) Notice: Subject to any disclaimer, the term of this patent is extended or adjusted under 35 U.S.C. 154(b) by 1211 days.

(21) Appl. No.: 12/027,789

(22) Filed: Feb. 7, 2008

(65) Prior Publication Data

US 2008/0124185 A1   May 29, 2008

Related U.S. Application Data

(63) Continuation-in-part of application No. 11/265,024, filed on Nov. 2, 2005, now Pat. No. 7,380,326.

(30) Foreign Application Priority Data

Oct. 12, 2006  (WO) ............... PCT/US2006/040246

(51) Int. Cl.
*B23P 11/00* (2006.01)
*B21D 15/10* (2006.01)
*F16B 19/08* (2006.01)

(52) U.S. Cl. .......... 29/432.1; 29/432; 29/432.2; 29/509; 29/525.06; 29/525.05; 29/243.53; 29/798; 72/466.4; 72/466.5; 72/469; 411/501; 411/181

(58) Field of Classification Search ............ 29/432, 29/432.1, 432.2, 505, 509, 525.01, 525.05, 29/525.06, 243.53, 243.522, 798; 72/466.4, 72/466.5, 469; 411/179, 181, 107, 501
See application file for complete search history.

(56) References Cited

U.S. PATENT DOCUMENTS

| | | | |
|---|---|---|---|
| 1,112,525 A * | 10/1914 | Darling | 248/187.1 |
| 2,147,763 A | 2/1939 | Becker | |
| 4,018,257 A * | 4/1977 | Jack | 411/181 |
| 4,430,034 A | 2/1984 | Fujikawa | |
| 4,459,073 A * | 7/1984 | Muller | 411/176 |
| 4,543,701 A | 10/1985 | Muller | |
| 4,555,838 A * | 12/1985 | Muller | 29/432.1 |
| 4,633,560 A * | 1/1987 | Muller | 29/798 |
| 4,713,872 A * | 12/1987 | Muller | 29/512 |
| 4,915,558 A | 4/1990 | Muller | |
| 5,020,950 A | 6/1991 | Ladouceur | |
| 5,056,207 A | 10/1991 | Ladouceur | |
| 5,067,224 A | 11/1991 | Muller | |
| 5,092,724 A | 3/1992 | Muller | |

(Continued)

FOREIGN PATENT DOCUMENTS

EP    0438105 B1    7/1991

(Continued)

*Primary Examiner* — Essama Omgba
(74) *Attorney, Agent, or Firm* — Dierker & Associates, P.C.

(57) ABSTRACT

A self-attaching fastener and panel assembly wherein the free open end of the tubular barrel portion is coined, collapsed axially, flattened and deformed radially inwardly and outwardly and axially against a panel surrounding the panel opening. The method of installation includes driving the free end of the tubular barrel portion against a substantially planar die surface, deforming an end portion radially, then collapsing an intermediate portion over the radially deformed end portion, flattening the end portion, substantially thickening the tubular barrel portion and forming an annular surface engaging and supporting the panel surrounding the opening. The die member includes an annular moat surrounding a central die post and a planar die surface extending generally perpendicular to the axis of the die button.

5 Claims, 8 Drawing Sheets

U.S. PATENT DOCUMENTS

| | | | |
|---|---|---|---|
| 5,140,735 A | 8/1992 | Ladouceur | |
| 5,174,018 A | 12/1992 | Muller | |
| 5,207,588 A | 5/1993 | Ladouceur et al. | |
| 2,465,534 A | 9/1994 | Havener | |
| 5,365,654 A * | 11/1994 | Moulton | 29/761 |
| 5,423,645 A * | 6/1995 | Muller et al. | 411/181 |
| 5,613,815 A * | 3/1997 | Muller | 411/181 |
| 5,644,830 A * | 7/1997 | Ladouceur et al. | 29/432.2 |
| RE35,619 E * | 10/1997 | Muller | 29/716 |
| 5,673,472 A * | 10/1997 | Muller | 29/432.1 |
| 5,752,305 A | 5/1998 | Cotterill et al. | |
| 5,779,127 A | 7/1998 | Blacket et al. | |
| 5,813,114 A | 9/1998 | Blacket et al. | |
| 5,868,535 A * | 2/1999 | Ladouceur | 411/181 |
| 5,884,386 A | 3/1999 | Blacket et al. | |
| 6,004,087 A | 12/1999 | Muller | |
| 6,089,437 A | 7/2000 | Blacket et al. | |
| 6,108,893 A | 8/2000 | Wojciechowski | |
| 6,116,835 A | 9/2000 | Blacket et al. | |
| 6,122,816 A | 9/2000 | Ladouceur | |
| 6,263,560 B1 * | 7/2001 | Edwards | 29/798 |
| 6,363,768 B1 * | 4/2002 | Earls et al. | 72/476 |
| 6,546,613 B2 | 4/2003 | Donovan | |
| 6,592,015 B1 | 7/2003 | Gostylla et al. | |
| 6,692,213 B1 | 2/2004 | Butler | |
| 6,725,521 B1 | 4/2004 | Blacket et al. | |
| 6,742,235 B2 | 6/2004 | Blacket et al. | |
| 6,796,454 B1 | 9/2004 | Matthews et al. | |
| 6,824,324 B2 * | 11/2004 | Hardt | 403/282 |
| 6,842,962 B1 | 1/2005 | Blacket | |
| 6,910,263 B2 | 6/2005 | Naito | |
| 6,944,944 B1 | 9/2005 | Craythorn et al. | |
| 6,951,052 B2 | 10/2005 | Clew | |
| 6,951,298 B1 | 10/2005 | Cogley et al. | |
| 7,047,617 B2 | 5/2006 | Ladouceur | |
| 7,152,294 B2 * | 12/2006 | Ladouceur | 29/432.1 |
| 7,155,798 B2 * | 1/2007 | Muller et al. | 29/512 |
| 7,179,034 B2 * | 2/2007 | Ladouceur | 411/181 |
| 7,287,944 B2 * | 10/2007 | Ladouceur | 411/107 |
| 7,380,326 B2 * | 6/2008 | Kovac | 29/505 |
| 7,624,504 B2 * | 12/2009 | Watanabe | 29/890.144 |
| 7,681,298 B2 * | 3/2010 | Babej | 29/524.1 |
| 7,810,231 B2 * | 10/2010 | Naitoh | 29/798 |
| 2002/0067975 A1 * | 6/2002 | Wojciechowski et al. | 411/183 |
| 2002/0095781 A1 | 7/2002 | Schmidt | |
| 2002/0166221 A1 | 11/2002 | Clew | |
| 2003/0154588 A1 | 8/2003 | Blacket et al. | |
| 2003/0167620 A1 * | 9/2003 | Wang et al. | 29/525.06 |
| 2004/0010903 A1 | 1/2004 | Edwards | |
| 2004/0076489 A1 | 4/2004 | Ladouceur | |
| 2004/0216304 A1 | 11/2004 | Naito | |
| 2004/0217144 A1 | 11/2004 | Matthews et al. | |
| 2004/0261259 A1 | 12/2004 | Naito | |
| 2005/0025605 A1 * | 2/2005 | Vrana et al. | 411/181 |
| 2005/0086799 A1 | 4/2005 | Kato et al. | |
| 2005/0111934 A1 | 5/2005 | Ladouceur | |
| 2005/0158143 A1 | 7/2005 | Ladouceur | |
| 2006/0115344 A1 | 6/2006 | Ladouceur | |
| 2010/0083480 A1 * | 4/2010 | Carter | 29/432 |

FOREIGN PATENT DOCUMENTS

| | | |
|---|---|---|
| EP | 1000250 B1 | 5/2000 |
| EP | 1294504 B1 | 9/2004 |
| EP | 0922866 B1 | 1/2005 |
| EP | 1512877 A2 | 3/2005 |

* cited by examiner

SELF-ATTACHING FASTENER AND PANEL ASSEMBLY, METHOD OF INSTALLATION AND DIE MEMBER

RELATED APPLICATION

This application is a continuation-in-part of application Ser. No. 11/265,024, filed Nov. 2, 2005, now issued as U.S. Pat. No. 7,380,326.

FIELD OF THE INVENTION

These inventions relates to self-attaching fasteners and panel assemblies, wherein the fastener is permanently attached to a panel, methods of attaching self-attaching fasteners to a panel and die members adapted to form self-attaching fastener and panel assemblies and methods of this invention.

BACKGROUND OF THE INVENTION

The predecessor in interest of the assignee of this application, Multifastener Corporation, first invented self-attaching fasteners over 50 years ago. As used herein, the term self-attaching fastener includes male and female self-piercing and self-clinching fasteners which are permanently attached to a panel, including pierce and clinch nuts. studs, bolts and the like, and pierce and clinch nuts and other female fasteners of this type. Self-attaching fasteners include a fastener portion, such as a threaded or unthreaded shank portion in the case of male fasteners, or a threaded or unthreaded bore in the case of female fasteners. In a typical application, self-attaching fasteners are fed to an installation head generally located in the upper die shoe or die platen of a die press and a die member or die button is located in the lower die shoe or die platen. The installation head typically includes a plunger which reciprocates through a plunger passage during installation to permanently install a self-attaching fastener in a panel supported on the die button with each stroke of the press. As will be understood by those skilled in this art, however, this arrangement may be reversed and self-attaching fasteners may be installed in any type of press.

Self-attaching fasteners of the type disclosed herein were first disclosed in U.S. Pat. No. 4,543,701 assigned to the predecessor in interest of the assignee of this application, the disclosure of which is incorporated herein by reference. Self-attaching fasteners of this type include a fastener portion and a tubular barrel portion having an open free end which is driven through an opening in the panel and deformed radially outwardly and accurately by a die button having a concave arcuate annular surface to permanently attach the fastener to the panel. In the embodiment of the self-attaching fastener and panel assembly and method of installation disclosed in this patent, the free open end of the tubular barrel portion is deformed radially outwardly into an L-shape and the panel is entrapped between a radial flange of the self-attaching fastener and the L-shaped barrel portion. However, this fastener and panel assembly did not provide sufficient integrity for commercial applications. U.S. Pat. No. 4,915,558, also assigned to a predecessor in interest of the assignee of this application, the disclosure of which is incorporated herein, discloses an improved method of installation, assembly and die member, wherein the free open end of the tubular barrel portion is deformed radially and accurately upwardly into a U-shaped annular channel or inverted and the panel surrounding the opening is deformed into the annular channel-shaped barrel portion to permanently attach the self-attaching fastener to the panel. The die button disclosed in this patent includes a central die post and an annular concave hemispherical die surface which receives the free end of the tubular barrel portion and deforms the barrel portion into an annular U-shaped channel. Simultaneously, the panel portion surrounding the panel opening is driven into the developing channel-shaped barrel portion forming a very secure installation. The embodiment of the self-attaching fastener and panel assembly disclosed in this patent has been and continues to be commercially successful.

There are, however, problems associated with the method of installation disclosed in the above-referenced U.S. Pat. No. 4,915,558. First, the tubular barrel portion is subject to cracking as the barrel portion is deformed against the annular concave hemispherical die surface, particularly if the roll over diameter exceeds a certain size. As will be understood, the barrel portion is subject to significant frictional resistance and hoop-stress as the barrel portion is deformed against the annular hemispherical die surface and deformed into the annular concave hemispherical shape. To reduce the frictional resistance, the barrel portion is coated with a lubricant, increasing the cost. Further, the complex die buttons are relatively expensive to manufacture and subject to failure because of the configuration of the annular concave hemispherical die surface which must be polished to minimize friction between the barrel and the self-attaching fastener and the dimensions are critical to proper installation. It is also important to note that many applications of self-attaching fasteners do not require piercing an opening in the panel with the free end of the barrel portion. Instead, an opening in the panel is prepierced or prepunched, the tubular barrel portion is received through the preformed opening and clinched to the panel as disclosed in the above-referenced patent.

The method of installing a self-attaching fastener of this invention substantially eliminates cracking of the barrel of the fastener and panel assembly, reduces the cost of the fastener by eliminating the requirement for a lubricant on the barrel and significantly reduces the cost and increases the life of the die button which is less expensive, simple and rugged in design.

SUMMARY OF THE INVENTION

As set forth above, this invention relates to self-attaching fastener and panel assemblies, methods of permanently attaching a self-attaching fastener to a panel and a relatively inexpensive rugged die button which may be utilized to form the self-attaching fastener and panel assembly of this invention using the method of installation of this invention. As also set forth above, the term "self-attaching fastener" as used herein includes both male and female fasteners including self-piercing fasteners, wherein the barrel portion is utilized to pierce an opening in the panel and self-clinching fasteners, wherein an opening is preformed in the panel prior to permanently installing the fastener in the panel opening. As discussed further below, although the disclosed method of installing a self-attaching fastener in a panel of this invention does not require piercing the panel with the barrel portion, it is believed that the method of this invention can also be used in a self-piercing application.

The disclosed embodiments of the self-attaching fastener and panel assembly of this invention a self-attaching fastener having a central portion, a radial flange portion extending radially from the fastener portion and a tubular portion having a free open end. The self-attaching fastener is permanently attached to a panel having an opening therethrough receiving the tubular barrel portion. In a disclosed embodiment, the free end of the tubular barrel portion is coined against a substantially planar die surface, collapsed axially, flattened and deformed radially inwardly, outwardly and axially against the panel opposite the radial flange portion of the self-attaching fastener forming a very secure installation. In the disclosed embodiment, the deformed annular barrel portion further includes a substantially planar or flat end face extending substantially parallel to a planar annular radial bearing face of the fastener. Further, in one disclosed embodiment, the panel of the fastener and panel assembly is entrapped between a deformed annular surface of the tubular barrel portion and the radial flange portion, forming a secure installation. In this embodiment, the free end of the tubular barrel portion is deformed toward the radial flange portion and the panel is deformed radially inwardly between the radial flange portion and the annular surface of the tubular barrel portion.

In one disclosed embodiment, the free end of the tubular barrel portion is deformed axially, radially inwardly and outwardly such that the thickness of the tubular barrel portion following installation is substantially greater than the thickness of the radial flange portion. In one disclosed embodiment, the central fastener portion of the self-attaching fastener is a bore extending axially through the self-attaching fastener which may be unthreaded to receive a thread forming male fastener or threaded to receive a threaded bolt, screw or the like. In another embodiment, the central fastener portion of the self-attaching fastener is a stud extending axially from the radial flange portion which may be threaded to receive an internally threaded female fastener or unthreaded to receive a thread forming female fastener.

In one embodiment of the method of attaching a self-attaching fastener to a panel of this invention, the method includes forming a self-attaching fastener including a fastener portion and an integral tubular barrel portion having a free open end. As set forth above, the fastener may also include a radial flange portion. The method of this invention then includes receiving the tubular barrel portion of the fastener through an opening in the panel. Finally, in one embodiment, the method of this invention includes driving the free open end of the tubular barrel portion against a substantially planar die face, deforming an end portion or the tubular barrel portion radially, then collapsing an intermediate portion over the radially deformed end portion, flattening the end portion, substantially thickening the tubular barrel portion and forming an annular surface engaging and supporting the panel surrounding the opening. In the disclosed embodiment, the free open end of the tubular barrel portion is initially deformed radially inwardly against a central die post of the die member forming an inwardly opening U-shaped end portion, then collapsing the intermediate portion over the U-shaped channel end portion. Although a die member having a central die post may be preferred in some applications to center the tubular die portion and control the collapse of the tubular barrel portion, a die member having a central die post is optional.

In one disclosed embodiment of the method of this invention, the tubular barrel portion includes a polygonal outer surface spaced from the radial flange portion and the method of this invention includes driving the polygonal outer surface into the panel opening, preventing rotation of the self-attaching fastener relative to the panel. In another disclosed embodiment, the radial flange portion includes a plurality of circumferentially spaced radial ribs or teeth and the radial flange portion is driven into the panel opening to prevent rotation of the self-attaching fastener relative to the panel.

The disclosed embodiment of the die member for attaching a self-attaching fastener to a panel includes a planar annular die surface extending perpendicular to an axis of the die member which may surround a central die post having an outer diameter equal to or less than the inner diameter of the free open end of the tubular barrel portion, wherein the annular planar die surface is adapted to coin, axially collapse, flatten and deform the free end of the tubular barrel portion inwardly, outwardly and axially as described above.

The method of attaching a self-attaching fastener to a panel and the fastener and panel assembly of this invention substantially eliminates cracking of the tubular barrel which is a significant problem with the method of installation disclosed in the above-referenced U.S. Pat. No. 4,915,558. The die button and method of installation of this invention further reduces wear of the die button and the die button is simpler and relatively inexpensive to manufacture because the requirement for a polished annular concave hemispherical die surface has been eliminated. Further, lubrication of the tubular barrel portion is not required for the methods of installation of this invention.

As will be understood by those skilled in this art and discussed further below, various modifications may be made to the self-attaching fastener and panel assembly, method of installation and die button of this invention with the purview of the appended claims. The embodiments of this invention disclosed in the following description of the preferred embodiments and drawings are for illustrative purposes only and thus do not limit the scope of this invention except as set forth in the appended claims. Other advantages and meritorious features of this invention will be more fully understood from the following description of the preferred embodiments, the appended claims and drawings, a brief description of which follows.

DESCRIPTION OF THE PREFERRED EMBODIMENTS

Figure 1:
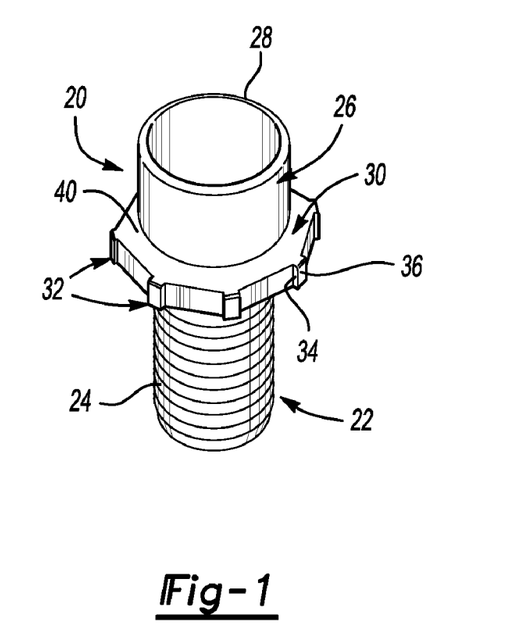
FIG. 1 is an end perspective view of one embodiment of a male self-attaching fastener which may be utilized to form the self-attaching fastener and panel assembly of this invention with the method of installation of this invention.
Figure 2:
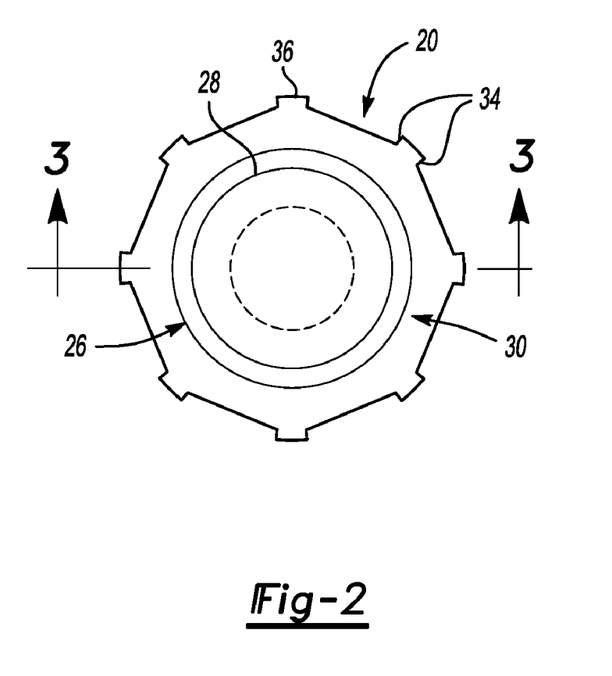
FIG. 2 is an end view of the self-attaching fastener shown in FIG. 1.

As set forth above, and discussed further hereinbelow, the embodiments of the self-attaching fastener and panel assembly, method of installing a self-attaching fastener in a panel and die member of this invention are disclosed for illustrative purposes only and do not limit this invention except as set forth in the appended claims. FIGS. 1 and 2 illustrate one preferred embodiment of a male self-attaching fastener which may be utilized in forming a self-attaching fastener and panel assembly of this invention utilizing the method of installation of this invention. As also set forth above, one advantage of the method of installation and die member of this invention is that a "conventional" self-attaching fastener may be utilized to form the self-attaching fastener and panel assembly of this invention. The embodiment of the self-attaching fastener shown in FIGS. 1 and 2 may also be substantially identical to the embodiment of the self-attaching fastener shown in co-pending U.S. patent application Ser. No. 10/961,803 filed Oct. 8, 2004, the disclosure of which is incorporated herein by reference. Alternatively, as discussed hereinbelow, the self-attaching fastener may be identical to the self-attaching fasteners disclosed in the above-referenced U.S. Pat. No. 4,543,701 or 4,915,558.

The self-attaching fastener 20 shown in FIGS. 1 and 2 includes a fastener portion 22 which, in the disclosed embodiment, is an externally threaded shank 24, a tubular barrel portion 26 having an open free end 28 and a radial flange portion 30. In one disclosed embodiment, the tubular barrel portion 26 is coaxially aligned with the radial flange portion 30 and the fastener portion 22 as an integral assembly. The shank portion 24 may also be unthreaded for receipt of a thread forming or thread rolling female fastener or other means for attachment to another member, such as a ball joint. In the disclosed embodiment of the fastener 20, the radial flange portion 30 includes a plurality of circumferentially spaced radial teeth 32 on an outer surface of the radial flange portion 30. In the disclosed embodiment, the radial teeth 32 include radial side faces 34 and planar end faces 36 as best shown in FIG. 2. However, as disclosed in the above-referenced co-pending U.S. application Ser. No. 10/961,803 filed Oct. 8, 2004, the radial teeth 32 may have various shapes and as discussed further hereinbelow, the radial teeth are optional. That is, other means may be provided to prevent relative rotation between the self-attaching fastener 20 in a panel following installation, such as an outer polygonal surface as shown, for example in FIG. 8.

Figure 3:
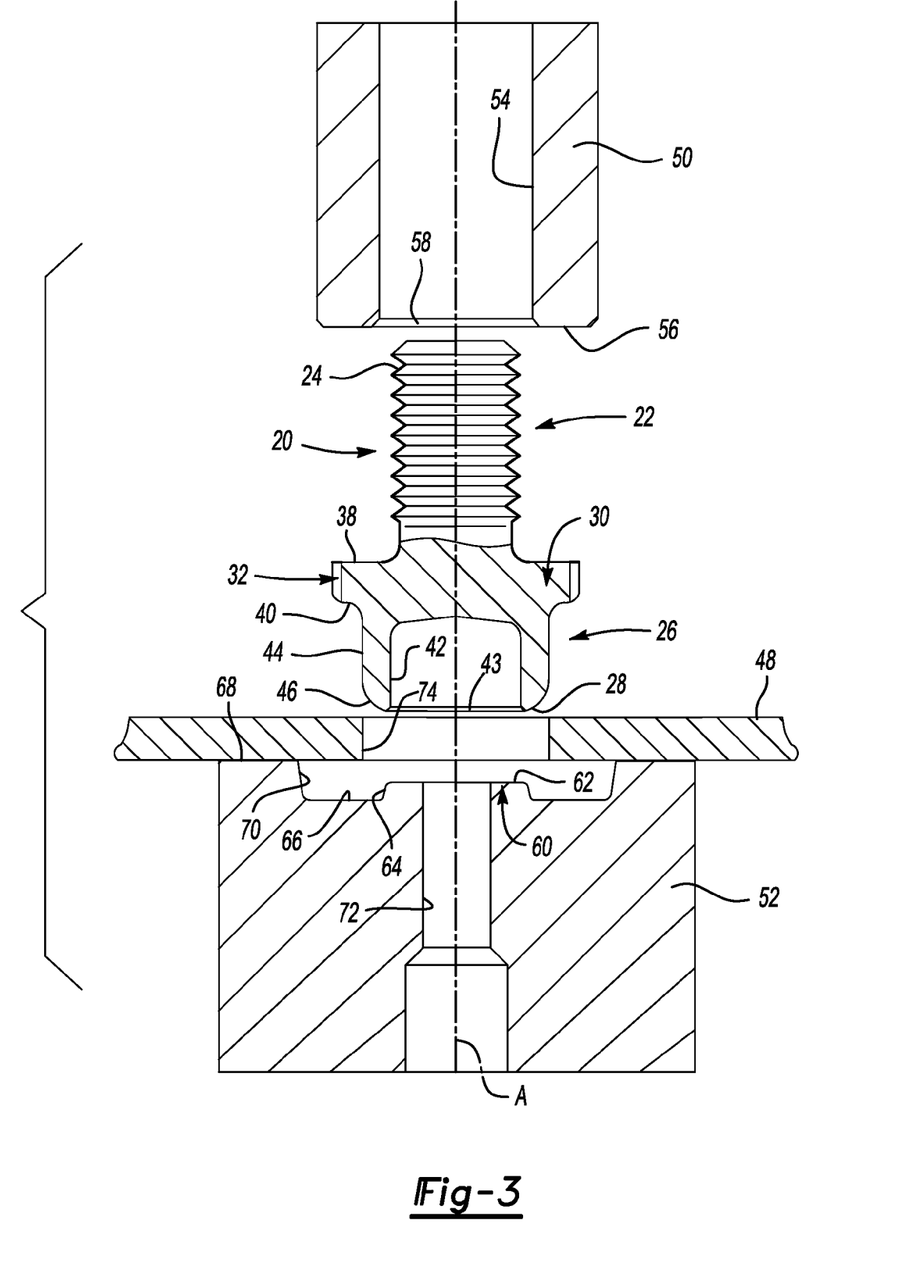
FIG. 3 is a side partially cross-sectioned view of the self-attaching fastener shown in FIGS. 1 and 2 aligned for installation in a panel in an installation apparatus with the die member of this invention.

As best shown in FIG. 3, the radial flange portion 30 includes an annular bearing or driven face 38 surrounding the barrel portion 26 and an opposed annular drive face 40. In one preferred embodiment of the self-attaching fastener 20, the radial flange portion 30 has a diameter greater than the fastener portion 22 and the tubular barrel portion 26. In the disclosed embodiment of the self-attaching fastener 20, the tubular barrel portion 26 includes a cylindrical internal surface 42, a coaxially aligned cylindrical outer surface 44 and an arcuate outer driven surface 46 adjacent the open free end 28. Alternatively, the internal or outer end surfaces 42 and 44 may be frustoconical depending upon the application.

FIG. 3 illustrates one embodiment of an installation apparatus for installing a male fastener element, such as the self-attaching fastener 20 in a panel 48. In a typical application, the panel 48 is a steel panel such as used by the automotive industry for mass production applications. However, the panel 48 may be any material, such as aluminum, aluminum alloys or even plastic. The installation apparatus shown in FIG. 3 includes a plunger 50 and a die member or die button 52. In the disclosed embodiment shown in FIG. 3, the plunger 50 includes a cylindrical opening or bore 54 configured to receive the fastener portion 22 of the self-attaching fastener 20 having an annular drive face 56 adapted to be driven against the annular bearing or driven face 38 of the radial flange portion 30. In the disclosed embodiment, the bore 54 of the plunger 50 includes a frustoconical counterbore 58 adjacent the drive face 56. The die button 52 in the disclosed embodiment includes a central die post 60 having a planar end or annular top face 62 and a frustoconical side face 64. The end or top face 62 is commonly referred to as the land. In a preferred embodiment of the die button 52, the bottom or die surface 66 is planar and extends substantially perpendicular to the longitudinal axis "A" of the die button. The die cavity surrounding the die post 60 is commonly referred to as the trough or moat. A central die post 60 may be used to center the installation but is not considered critical and is thus considered optional. In one embodiment, the die button 52 includes an annular planar bearing surface 68 which supports the panel 48 during installation as shown in FIG. 3. In a typical application, the panel 48 will be secured to the annular planar bearing surface 68 by clamps or other securement means. As described further hereinbelow, the outer face 70 of the moat or trough of the die button 52 may have any configuration because the tubular barrel portion 26 preferably does not engage the outer surface 70 during installation, but is permitted to flow radially outwardly without restriction. In the disclosed embodiment, the outer face 70 is frustoconical. In one preferred embodiment, the die button 52 further includes a central bore 72 which permits escape of air during installation.

As shown in FIG. 3, a first step of the method of installing a fastener 20 in a panel 48 is to align the self-attaching fastener 20 with the die button 52 along axis A, such that the tubular barrel portion 26 is aligned with the center post 60 or the axis of the die button and the side face 64 of the center post 60 may be configured to receive the internal surface 42 of the tubular barrel portion 26. As will be understood by those skilled in this art and as disclosed in the above-referenced U.S. Pat. No. 4,915,558, self-attaching fasteners 20 are typically received in an installation head having a plunger 50, wherein the installation head (not shown) is secured in the upper die shoe or die platen of a die press and the die button 52 is secured in the lower die shoe or die platen of a die press (not shown). However, the self-attaching fastener 20 may be installed in a panel 48 in any type of press. As described further hereinbelow, it is believed that the self-attaching fastener 20 may be utilized to pierce an opening in the panel 48 during the installation of the self-attaching fastener 20 in a panel 48. However, in the embodiment of the method disclosed herein, an opening 74 is preformed, pierced or punched from the panel having an internal diameter greater than the diameter of the outer surface 44 of the tubular barrel portion 26, but less than the outer diameter of the radial flange portion 30. In a typical application, the fastener portion 22 of the self-attaching fastener 20 is first received in the bore 54 of the plunger 50 in the installation head (not shown) and the plunger, which may be fixed to the upper die shoe or die platen of a press (not shown) is driven toward the die button 52 and the panel 48 supported on the annular planar bearing surface 68 of the die button as the press is closed. As set forth above, however, this arrangement may be reversed, wherein the die button 52 is fixed in the upper die shoe or die platen or the installation may be horizontal in any type of press.

Figure 4:
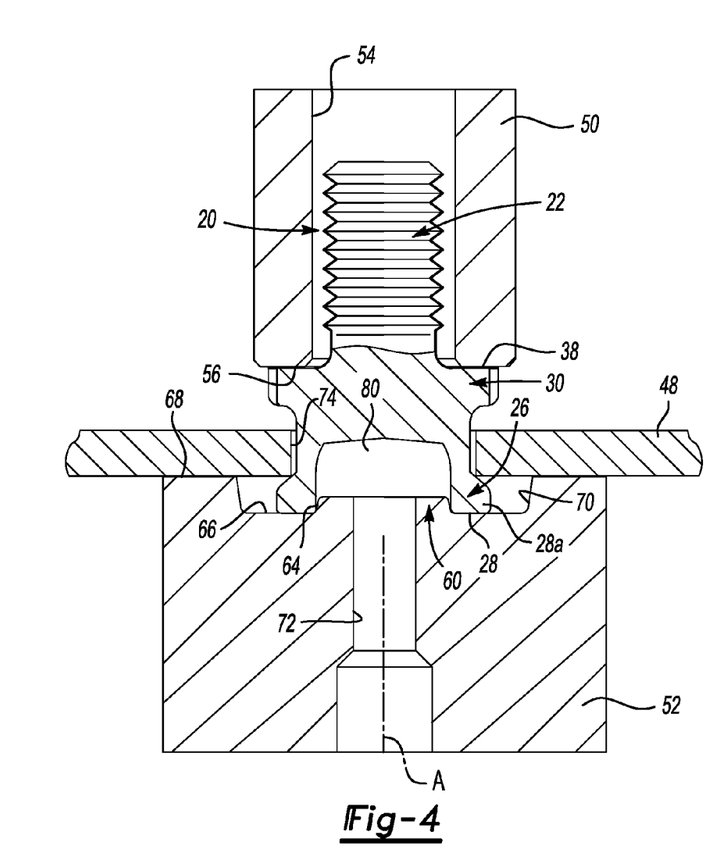
FIG. 4 is a side partially cross-sectioned view of FIG. 3 during installation of the self-attaching fastener in a panel.

The free end 28 of the tubular barrel portion 26 is then driven through the opening 74 in the panel 48 and against the planar die surface 66 of the trough or moat of the die button 52 by the plunger 50 as shown in FIG. 4. Because the bottom surface 66 of the moat or trough of the die button 52 is planar and substantially perpendicular to the longitudinal axis A of the die button, the free end 28 of the tubular barrel portion is coined or deformed axially toward the radial flange portion 30, shortening or reducing the axial length and increasing the thickness of the barrel portion and flattening the end 28 Further, because the outer surface 64 of the center post 60 prevents radially inward deformation, the free end 28 of the tubular barrel portion 26 is simultaneously deformed radially outwardly in this embodiment as shown at 28a in FIG. 4. As will be understood by those skilled in this art, the free end 28 of the tubular barrel portion 26 is compressed beyond its yield point as the tubular barrel portion 26 is driven against the planar die surface 66. Further, the free end 28 is flattened against the planar die surface 66.

Figure 5:
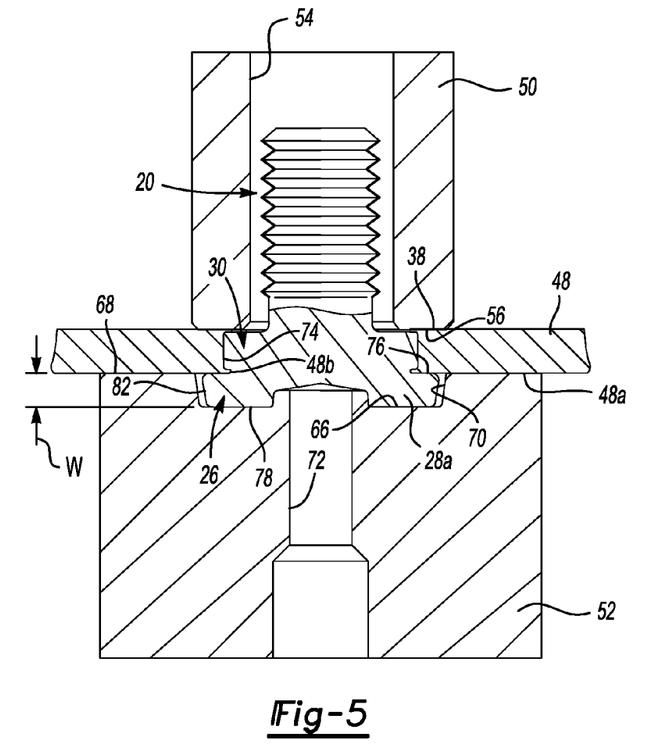
FIG. 5 is a side partially cross-sectioned view of the installation apparatus shown in FIGS. 3 and 4 with the self-attaching fastener installed in a panel.

Finally, as shown in FIG. 5, continued coining and flattening of the barrel portion 26 against the planar bottom wall 66 of the trough or moat or the die button 52 forms a substantially planar radial annular surface 76 which is deformed or coined radially beneath the panel 48 surrounding the panel opening 74 which is driven against the panel face 48a as shown in FIG. 5. The free open end 28 of the tubular barrel portion 26 shown in FIG. 3 is also flattened, forming a planar end face 78 which is parallel to the planar radial surface 76 which supports the panel 48. The air entrapped in the confined space 80 shown in FIG. 4 is allowed to escape through the bore 72.

As shown in FIG. 5, in this disclosed embodiment of the self-attaching fastener and panel assembly, the annular barrel portion 26 may have a width "W" or thickness greater than the radial flange portion 30 providing a very rugged and secure installation. Further, the coined annular barrel portion 26 may be spaced from the radial flange portion 30, such that panel metal 48b is deformed radially between the radial flange portion 30 and the annular barrel portion 26 as shown in FIG. 5 providing greater push-off strength. Further, because the radial flange portion 30 has a greater diameter than the opening 74 through the panel 48, the radial flange portion is driven into the panel providing further push-off strength. Where the radial flange portion 30 includes radial teeth 32 as shown in FIGS. 1 and 2, the radial teeth (not shown in FIG. 5) are driven into the panel preventing rotation of the self-attaching fastener 20 and the panel 48 following installation. It is also important to note that the barrel portion 26 is not deformed radially into contact with the outer face 70 of the moat of the die button 52 as shown in FIG. 5. That is, the radial deformation of the annular barrel portion 26 is permitted to deform radially unrestrained in the trough or moat of the die button 26, such that the outer surface 82 of the annular barrel portion 26 does not engage the outer face 70 of the moat of the die button. However, because the radial deformation of the annular barrel portion 26 is unrestrained and deformed against the planar die face 66, the outer surface 82 is frustoconical as shown in FIG. 5.

Figure 6:
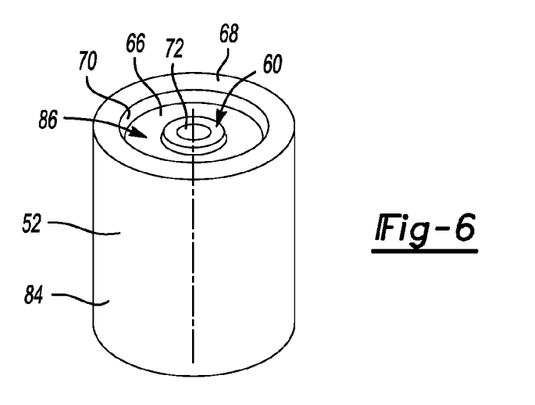
FIG. 6 is a top perspective view of the die member shown in FIGS. 3 to 5.
Figure 7:
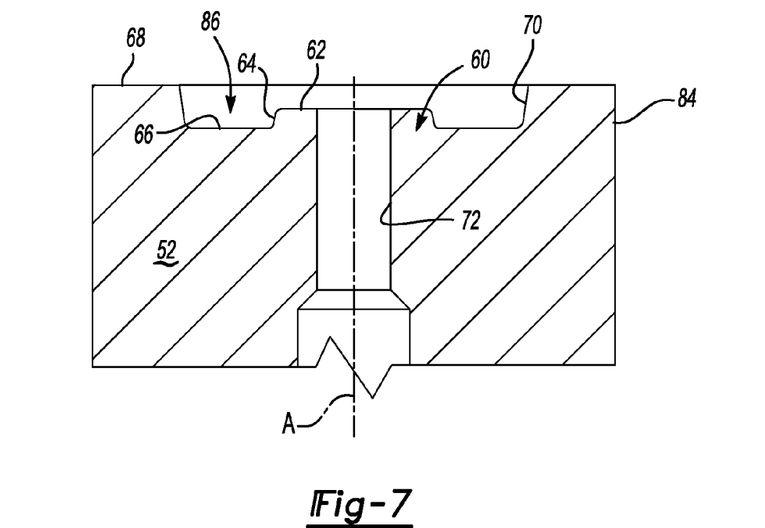
FIG. 7 is a side cross-sectional view of the die member shown in FIGS. 3 to 6.

FIGS. 6 and 7 illustrate one preferred embodiment of the die button 52 described above. The die button 52 may include a cylindrical outer surface 84 adapted to be received in a cylindrical opening in the lower die platen (not shown) to securely retain the die button in the die shoe. The die button includes an annular panel support face 68, a central die post 60 having an end face 62 and a frustoconical side face 64. The annular bottom face 66 of the moat or trough 86 surrounding the die post 60 is preferably substantially planar and extends perpendicular to the longitudinal axis A of the die button 52. In the disclosed embodiment of the die button 52, the outer face 70 of the moat 86 is frustoconical to conform to the frustoconical outer surface 82 of the annular barrel portion 26 as shown in FIG. 5, but may be any shape which preferably does not restrict the radial and axial coining and radial deformation of the annular barrel portion 26. Further, one preferred embodiment of the die button 52 includes an axial bore 72 to permit the escape of air as described above. The die button 52 is preferably formed of hardened steel and the bottom surface 66 may be polished, but polishing will not be required in many applications. As will be understood by those skilled in this art, the die button 52 is substantially less expensive than the die buttons disclosed in the above-referenced U.S. patents and co-pending application, the die button 52 is substantially easier to manufacture and less subject to wear.

Figure 8:
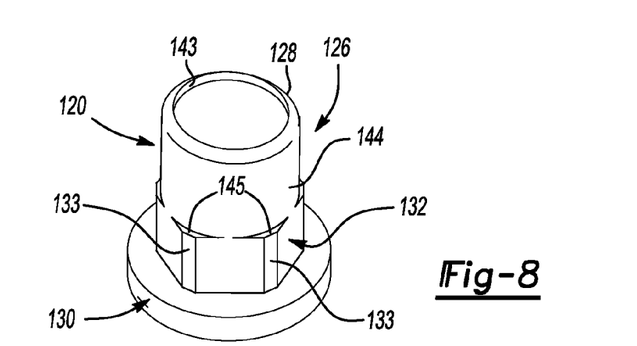
FIG. 8 is an end perspective view of an alternative embodiment of a female self-attaching fastener which may be utilized to form the self-attaching fastener and panel assembly of this invention utilizing the method of installation and die member, of this invention.
Figure 9:
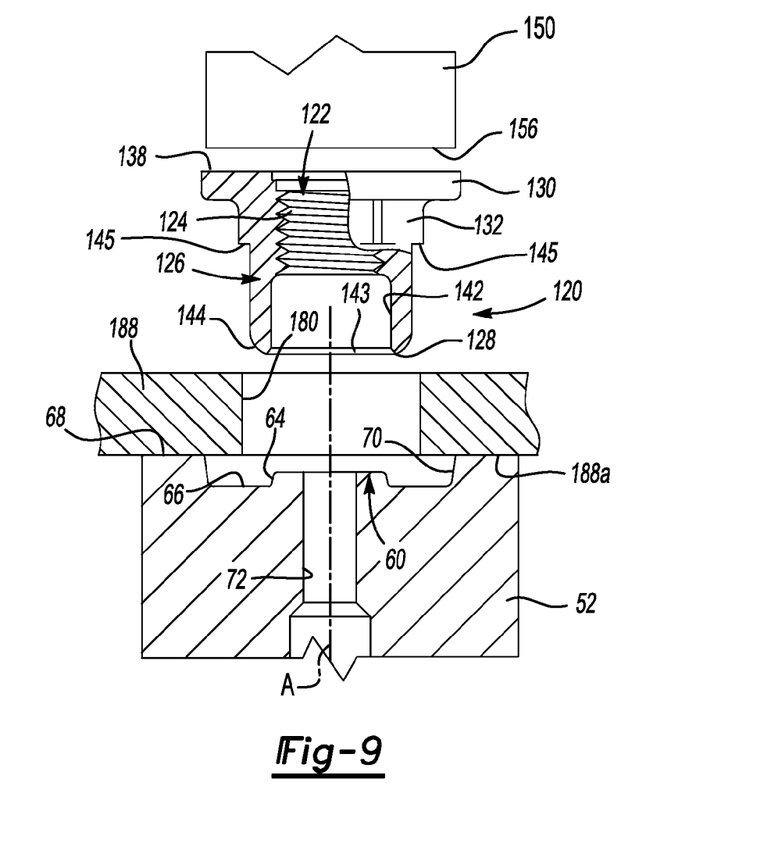
FIG. 9 is a side partially cross-sectioned view of the female self-attaching fastener shown in FIG. 8 aligned in an installation apparatus for installing the self-attaching fastener in a panel.
Figure 10:
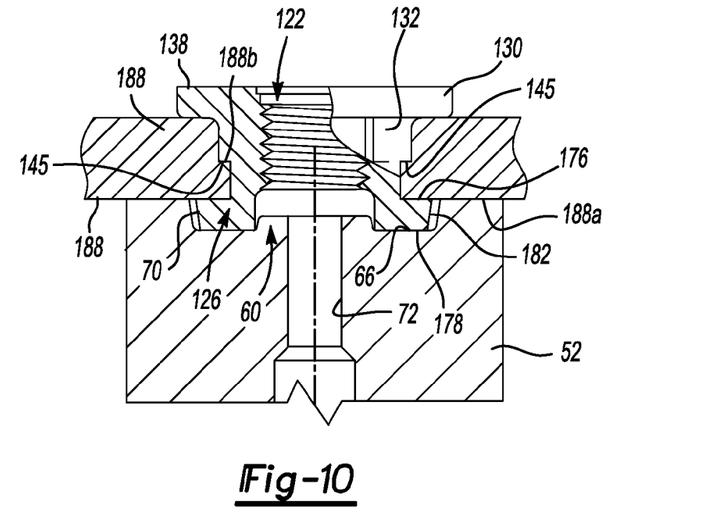
FIG. 10 is a side partially cross-sectioned view of the self-attaching fastener installed in a panel.

FIGS. 8 to 10 illustrate a female self-attaching fastener 120 which may be utilized to form a self-attaching fastener and panel assembly by the method of installation of this invention and utilizing the die button 52 described above. Because many of the elements of the female self-attaching fastener 120 are the same as the male self-attaching fastener 20 described above, the common elements have the same reference numbers as the male self-attaching fastener 20 except 100 is added to the reference numbers of the male self-attaching fastener 20. The female self-attaching fastener 120 includes a fastener portion 122 which, in the disclosed embodiment, is a bore which is internally threaded as shown at 124 in FIGS. 9 and 10. However, the bore may be unthreaded to receive a male thread forming or thread rolling fastener, such as a stud. The female self-attaching fastener 120 further includes a tubular barrel portion 126 having an open free end 128. However, in this embodiment, the internal surface 142 is cylindrical and the outer surface 144 is cylindrical including a truncated polygonal surface 132 adjacent the radial flange 130 which prevents rotation of the self-attaching female fastener 120 relative to the panel following installation. In this embodiment, the corners 133 of the polygonal surface 132 are truncated and the surfaces 145 extend generally perpendicular to the longitudinal axis of the fastener. Further, the internal surface 142 may include a frustoconical surface 143 adjacent the free end 128. The female self-attaching fastener 120 further includes a radial flange portion 130. However, in this embodiment, the radial flange portion does not include radial teeth 32 shown in FIGS. 1 and 2. As will be understood by those skilled in this art, torque resistance may be provided by any suitable means including but not limited to radial ribs or teeth 32 on the outer surface of the radial flange or a polygonal outer surface 132 of the tubular barrel or radial flange as shown.

The method of installing the self-attaching female fastener 120 as shown in FIGS. 9 and 10 may be similar to the method described above. That is, the self-attaching female fastener 120 is first aligned with the die button 52 having a planar bottom die surface 66 substantially perpendicular to the longitudinal axis A and a central die post 60 having an outer surface 64 coaxially aligned with the tubular barrel portion 126, wherein the diameter of the outer surface 64 is generally equal or slightly larger than the diameter of the cylindrical internal surface 142 of the tubular barrel portion 126. As stated above, however, the central die post 60 is considered optional. The panel 188 is supported on the annular planar bearing surface 68 of the die button 52 as described above and the free end 128 of the tubular barrel portion 126 is driven through the panel opening 180 against the planar die surface 66 of the die button 52 by the plunger 150. In this embodiment, the opening 180 through the panel 188 is greater than the diameter of the free open end 128 of the pilot portion 126, but less than the major diameter of the polygonal outer surface 132. Of course, it is also less than the diameter of the radial flange portion 130. As described above with regard to FIGS. 4 and 5, as the free end 128 of the tubular barrel portion 126 is driven against the planar bottom wall 66 of the die button 52, the barrel portion 126 is coined and deformed radially outwardly against the planar die surface 66 axially and radially forming a planar radial surface 176 which is deformed beneath and against the surface 188a of the panel 188 and the end surface 178 is deformed into a planar end face 178 forming a very secure installation. In this embodiment, however, the panel 188b is deformed beneath the radial surface 145 of the barrel portion, providing further push-off strength. As described above, inward radial deformation is prevented by the outer surface 64 of the central die post 60 shown in FIG. 9. As also described above, the outer surface 182 of the annular barrel portion 166 is not restrained by the outer surface 70 of the die button. Thus, the method of installing the female self-attaching fastener 120 may be the same as the method of installing the male self-attaching fastener 20 and thus no further description of the method is required.

Figure 11:
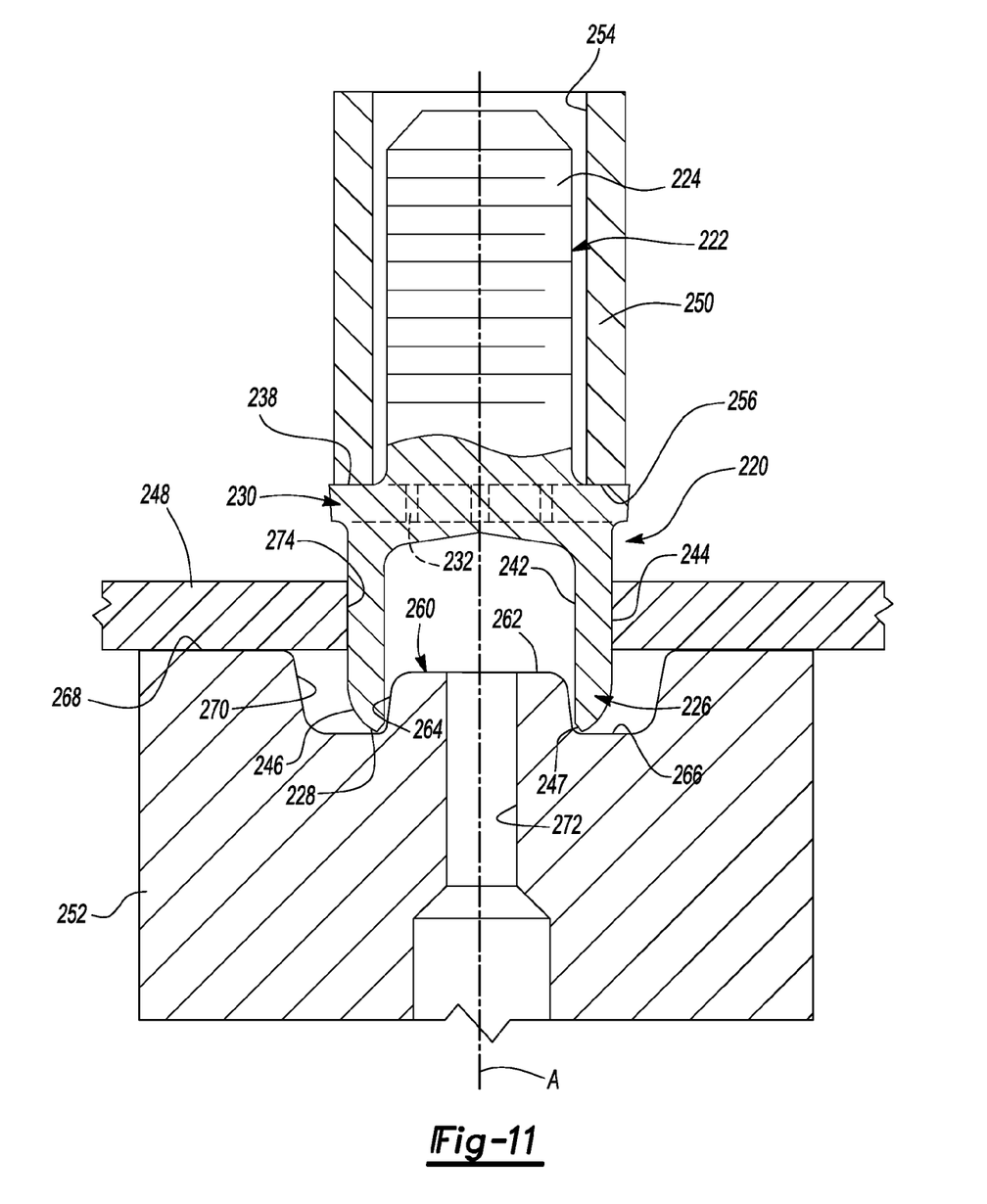
FIG. 11 is a side partially cross-sectioned view of another embodiment of a self-attaching fastener, die button and panel assembly ready for installation of the fastener.

FIG. 11 illustrates a further embodiment of a male self-attaching fastener 220 ready for installation in a panel and FIGS. 11 to 14 illustrate a further method of installation. The self-attaching male fastener 220 may be similar, but is not identical to the self-attaching male fastener 20 described above with reference to FIGS. 1 and 2. To reduce the required description and for ease of understanding, the self-attaching male fastener 220, die button 252 and panel 248 have been numbered in the same sequence as the self-attaching fastener 20, die button 52 and panel 48 in FIGS. 1 to 5, except that 200 has been added to the reference numbers of FIGS. 1 to 5. In the disclosed embodiment, the self-attaching male fastener 220 includes a fastener portion 222 which, in this embodiment, is a threaded shank 224. The self-attaching fastener 220 further includes an integral tubular barrel portion 226 having an open free end 228 and the fastener further includes a radial flange portion 230 having radial teeth 232 as shown, for example, in FIGS. 1 and 2 at 32. The radial flange portion 234 includes an annular bearing face 238 and a drive face. The tubular barrel portion 226 includes a cylindrical inner surface 242 and a cylindrical outer surface 244, an arcuate driven surface 246 extending from the cylindrical outer surface 244 toward the inner surface 242 and, in this embodiment, the free end 228 includes a frustoconical surface 247 which helps center the free end 228 of the tubular barrel portion 226 during installation as described in the above-referenced U.S. patents.

As described above with reference to FIGS. 3 to 5, the installation tooling includes a plunger 250 and a die button 252. The plunger 250 includes a cylindrical bore 254 which receives the fastener portion 220 as shown in FIG. 11. The plunger 250 further includes a drive face 256 received against the annular bearing face 238 of the radial flange portion 234 as described above. In the disclosed embodiment of the die button 252, the die button includes an annular moat surrounding a center post 260 having an end or top face 262 and a frustoconical side face 264. As described above, however, the center post 260 may be preferred, but is considered optional. The moat of the die button 252 in this embodiment surrounds a center post 260 having an end or top face 262 and a frustoconical side face 264 with arcuate surfaces blending into the top face 262 and the annular flat bottom face 266. As described above, the bottom face 266 is preferably planar and extends generally perpendicular to the axis A of the die button 252. The die button 252 further includes an annular planar support surface 268 surrounding the moat which receives the panel 248 as shown in FIG. 11. In this embodiment of the method of this invention, a cylindrical opening 274 is pierced or punched through the panel 248 having an inner diameter generally equal to or slightly greater than the outer diameter of the cylindrical surface 244 of the tubular barrel portion 226. As described above and in the above-referenced U.S. patents, the plunger 250 is typically attached to the upper die shoe of a press and the die button 252 is attached to the lower die shoe. An installation apparatus (not shown) feeds self-attaching fasteners 220 to the installation head in the upper die shoe and the plunger 250 receives the fastener portion 222 in the cylindrical bore 254 and the plunger then drives the tubular barrel portion 226 through an opening 274 in the panel 248 into the moat of the die button 252 against the annular planar surface 266 as described above as the press is closed.

Figure 12:
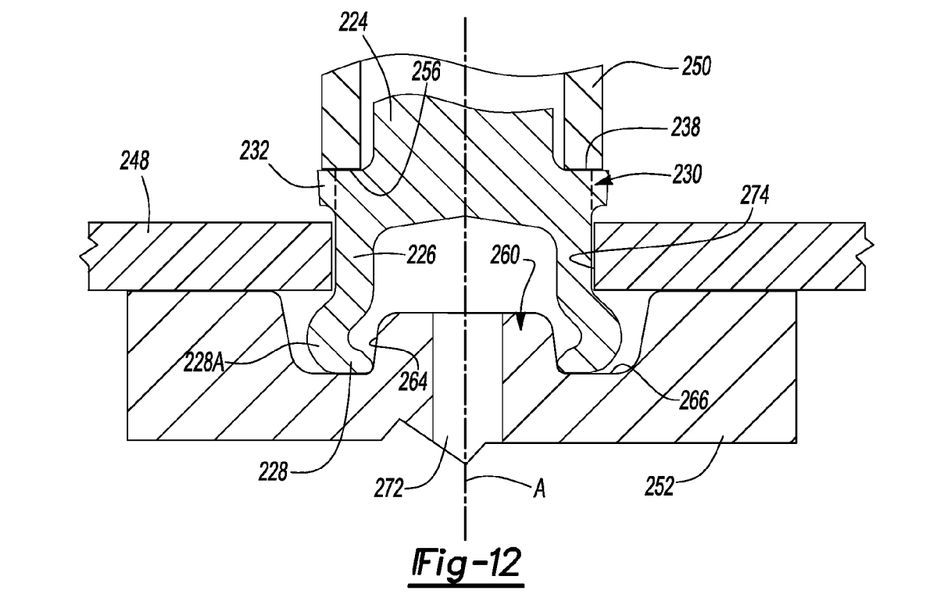
FIG. 12 is a partial side cross-sectional view of FIG. 11 during installation of the self-attaching fastener in a panel.
Figure 13:
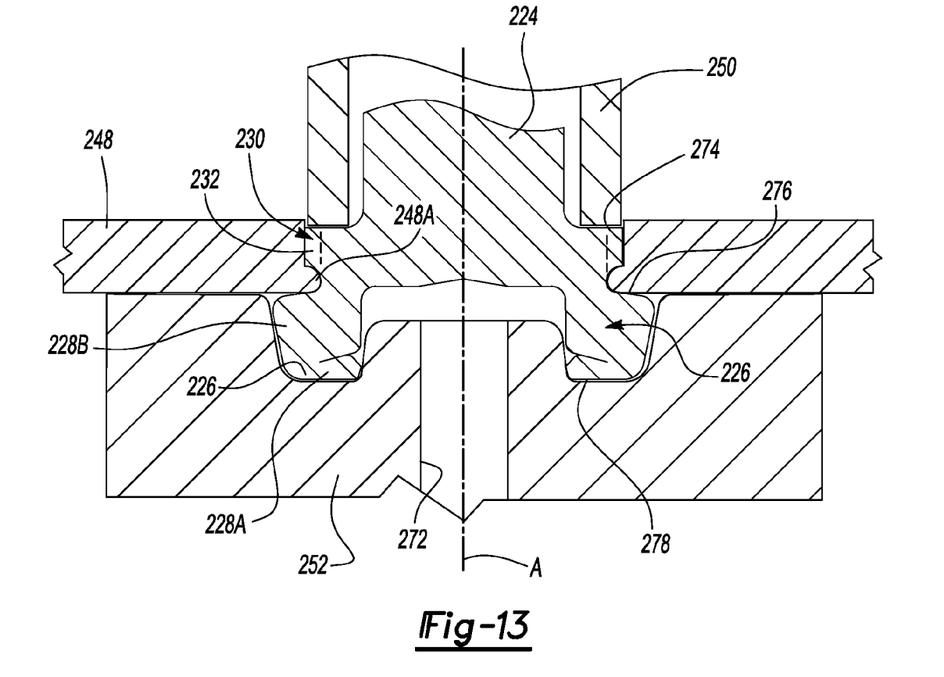
FIG. 13 is a side, partially cross-sectioned view of FIGS. 11 and 12 following installation of the self-attaching fastener in a panel.
Figure 14:
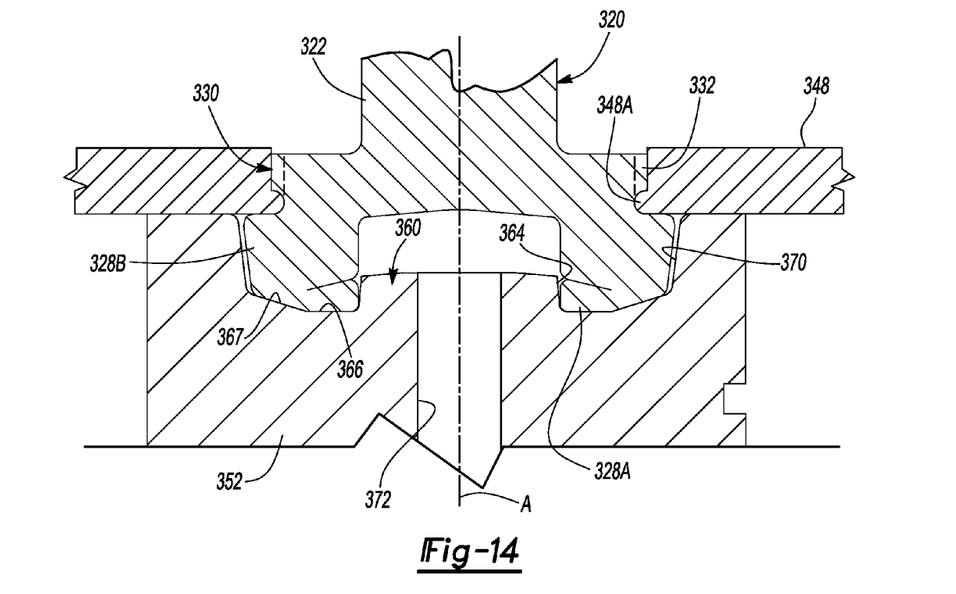
FIG. 14 is a side cross-sectional view of a further embodiment of a self-attaching fastener following installation in a panel with a different embodiment of a die button.

FIGS. 12 to 14 illustrate a self-attaching male fastener 220 in a panel 248 with the die button 252 described above. The free end 228 of the tubular barrel portion 226 is first driven against the annular planar die surface 226, deforming the free end 228 of the tubular barrel portion 226 radially inwardly against the outer surface 226 of the center die post 260, deforming the free end 228 into a U-shaped end portion 228A as shown in FIG. 12. It is anticipated, however, that the free end of the tubular barrel portion 226 could be deformed radially outwardly, particularly if the center post of the die is eliminated. As the plunger 250 continues to drive the tubular barrel portion 226 into the die moat, an intermediate portion 228B of the barrel portion 226 is collapsed over the radially inwardly deformed end portion 228A as shown in FIG. 13. The free end 228A is further flattened against the annular planar die face 226 forming a planar end face 278 as shown in FIG. 13. Further, a portion of the panel 248A is deformed radially inwardly over the planar radial surface 276 of the intermediate portion 228B as also shown in FIG. 13, forming a very secure installation. As shown in FIG. 13, the barrel portion 226 has a thickness following deformation greater than the thickness of the radial flange portion 230 and the radial flange portion 230 is driven into the panel opening 274 with the panel deformed radially between the radial teeth 232 as described above with regard to FIGS. 4 and 5.

FIG. 14 illustrates a further embodiment of the method of installing a self-attaching fastener in a panel of this invention, wherein the die button 352 includes a first annular planar surface 366 extending perpendicular to the axis A which initially receives the free end of the tubular barrel portion 228 in FIG. 11 and a second outboard planar surface 367 extending generally perpendicular to the axis A which, in the disclosed embodiment, is frustoconical. In the embodiment of the die button 352 shown in FIG. 14, the moat surrounding the central die post 360 is shallower, the outer surface 364 of the die post is substantially parallel to the axis A, but is slightly frustoconical, and the outer surface 370 is also generally parallel to the axis A, but is frustoconical radially outwardly. The self-attaching male fastener 320 may be substantially identical to the male fastener 220 shown in FIG. 11.

As described above with reference to FIGS. 12 and 13, the free end is driven against the annular planar surface 366 of the die button 352, deforming the free end radially inwardly against the outer surface 364 of the center die post 360. The intermediate portion 328B is then collapsed and deformed against the free end portion 328A, shortening the barrel portion and deforming the barrel portion radially inwardly and outwardly forming a very secure installation. As described above, a portion of the panel 348A is deformed radially inwardly beneath the radial flange portion. This forms a very secure installation.

As will be understood by those skilled in this art, various modifications may be made to the disclosed embodiments of the self-attaching fastener and panel assembly, method of installation and die member of this invention within the purview of the appended claims. Although a preferred embodiment of the method of installing a self-attaching fastener in a panel of this invention includes performing an opening in the panel prior to installation which permits installation of the self-attaching fastener in thicker or heavier panels, it is believed that the self-attaching fastener may also be utilized to pierce an opening in the panel as disclosed in the above-referenced U.S. patents. However, this method of installation may require a separate reciprocable die post as disclosed in the above-referenced U.S. Pat. No. 4,543,701 or in some applications the die post may be eliminated. That is, the die post 60 may be formed as a separate element and movable relative to the remainder of the die button. Further, as described above, various anti-rotation means may be utilized to prevent relative rotation of the self-attaching fastener to the panel following installation and thus the radial teeth 32 extending from the radial flange portion 30 are optional, but preferred in some applications. However, a polygonal outer surface, as shown for example at 132 in FIG. 8, is less expensive to manufacture and provides sufficient torque resistance for many applications. Further, because the tubular barrel portion is not deformed against a concave annular hemispherical die surface to invert the free end of the barrel portion into an annular hook-shape as disclosed in the above-referenced U.S. Pat. No. 4,915,558, the substantial frictional resistance is eliminated, permitting the use of various shaped tubular barrel portions including, for example, polygonal-shaped tubular barrel portions. The barrel portion may also be oval-shaped or other shapes depending upon the application. The preferred shape of the generally planar bottom wall of the die button moat will also depend upon the application. Further, as described above, any type of self-attaching fastener may be utilized; including male and female self-attaching fasteners provided the self-attaching fastener includes a fastener portion and a tubular barrel portion. A self-attaching fastener having a radial flange portion is also preferred, but a radial flange portion is not required. Further, as described above, the installation apparatus will depend upon the application and any type of press may be utilized, including a horizontal press or a press wherein the die button 52 is located in the upper die platen. Further, as will be understood by persons skilled in this art, the length of the barrel portion and diameter of the radial flange portion may be modified as shown for example by a comparison of FIGS. 3 and 11.

As set forth above in the summary of the invention, the self-attaching fastener and panel assembly, method of installation and die button of this invention have several important advantages over the prior art, including the above-referenced U.S. patents. The method of installation of this invention is particularly, but not exclusively, for mass production applications such as utilized by the automotive industry. Further, one or a plurality of self-attaching fasteners may be installed with each stroke of a die press, wherein the panel is also formed to a desired shape. The self-attaching fastener and panel assembly and method of installation of this invention substantially eliminates cracking of the tubular barrel during installation. Further, as described above, the method of installing a self-attaching fastener of this invention eliminates the very substantial frictional resistance of the concave annular hemispherical die surface as the free end of the tubular barrel portion is deformed into an inverted hook-shape as disclosed in the above-referenced U.S. Pat. No. 4,915,558, thereby eliminating cracking of the barrel and significantly reducing the cost of the die button. Having described the preferred embodiments of the self-attaching fastener and panel assembly, method of installation and die button of this invention, the invention is now claimed as follows.

The invention claimed is:

1. A method of attaching a self-attaching fastener to a panel, comprising the following steps:
   forming a self-attaching fastener including a central fastener portion and an integral tubular barrel portion having a free open end;
   receiving the free open end of said tubular barrel portion through an opening in a panel; and
   driving said free open end of said tubular barrel portion against a substantially planar die face, deforming an end portion radially inwardly and buckling said tubular barrel portion, thereby forming an inwardly opening annular channel, then collapsing an intermediate portion over said radially deformed end portion, forming a crease by collapsing said annular channel, flattening said end portion, substantially thickening said tubular barrel portion and forming an annular surface engaging and supporting said panel surrounding said opening.

2. The method as defined in claim 1, wherein said method includes deforming said end portion of said tubular barrel portion inwardly against a central die post of the die, and wherein said inwardly opening annular channel is U-shaped.

3. The method as defined in claim 1, wherein said method includes forming the self-attaching fastener including a radial flange portion integral with and adjacent to the tubular barrel portion and the tubular barrel portion including a polygonal outer surface spaced from the radial flange portion, driving the polygonal outer surface of the tubular barrel portion into the panel opening preventing rotation of the self-attaching fastener relative to the panel.

4. The method as defined in claim 3, wherein the method further includes driving the radial flange portion against the panel.

5. The method as defined in claim 1, wherein the method further includes entrapping the panel between a radial flange portion of the self-attaching fastener and the deformed tubular barrel portion.

* * * * *